United States Patent
Brown (10) Patent No.: US 10,338,651 B2
(45) Date of Patent: Jul. 2, 2019

(54) COMPUTING DEVICE LOCATION (71) Applicant: Hewlett Packard Enterprise Development LP, Houston, TX (US)

(72) Inventor: Andy Brown, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 163 days.

(21) Appl. No.: 15/327,668

(22) PCT Filed: Mar. 12, 2015

(86) PCT No.: PCT/US2015/020290
§ 371 (c)(1),
(2) Date: Jan. 20, 2017

(87) PCT Pub. No.: WO2016/144369
PCT Pub. Date: Sep. 15, 2016

(65) Prior Publication Data
US 2017/0205860 A1    Jul. 20, 2017

(51) Int. Cl.
| | | |
|---|---|---|
| G06F 1/24 | (2006.01) | |
| G06F 1/14 | (2006.01) | |
| G06F 11/30 | (2006.01) | |
| H04L 12/24 | (2006.01) | |

(52) U.S. Cl.
CPC .............. *G06F 1/24* (2013.01); *G06F 1/14* (2013.01); *G06F 11/3051* (2013.01); *H04L 41/0853* (2013.01); *H04L 41/12* (2013.01)

(58) Field of Classification Search
CPC .......... G06F 1/24; G06F 1/14; G06F 11/3051; H04L 41/0853

USPC .............. 709/203, 204; 726/26, 7; 713/300; 358/1.14
See application file for complete search history.

(56) References Cited

U.S. PATENT DOCUMENTS

| | | | |
|---|---|---|---|
| 5,247,464 A | 9/1993 | Curtis | |
| 7,302,593 B2 | 11/2007 | Rothman | |
| 8,233,432 B2 | 7/2012 | Northcutt | |
| 9,671,846 B1 * | 6/2017 | Davis | G06F 1/28 |
| 2002/0138771 A1 * | 9/2002 | Dutta | H04L 63/0442 726/26 |
| 2003/0046339 A1 * | 3/2003 | Ip | H04L 41/12 709/203 |

(Continued)

OTHER PUBLICATIONS

"Switched Rack PDU," Aug. 9, 2011, 2 Pgs., < http://www.apc.com/products/family/?id=70 >.

(Continued)

*Primary Examiner* — Aurel Prifti
(74) *Attorney, Agent, or Firm* — Hewlett Packard Enterprise Patent Department (57) ABSTRACT

Examples disclosed herein relate, in one aspect, to a computing device. The computing device may include a timing engine and a location engine. The timing engine may obtain reset information associated with a plurality of computing devices located at a plurality of locations, wherein each computing device comprises a timer. The timing engine may also obtain timer values of the timers of the plurality of computing devices. The location engine may determine, based at least on the reset information and the timer values, the location of at least one of the plurality of computing devices.

14 Claims, 5 Drawing Sheets

(56) References Cited

U.S. PATENT DOCUMENTS

| | | | | |
|---|---|---|---|---|
| 2010/0244567 | A1* | 9/2010 | Brookshire | H01M 10/48 307/66 |
| 2011/0248859 | A1* | 10/2011 | Park | H04N 13/0429 340/636.1 |
| 2014/0071479 | A1* | 3/2014 | Hikichi | H04N 1/00896 358/1.14 |
| 2014/0164813 | A1 | 6/2014 | Alshinnawi | |
| 2014/0304336 | A1* | 10/2014 | Renzin | G06F 15/177 709/204 |
| 2014/0320288 | A1 | 10/2014 | Groth | |
| 2015/0067401 | A1 | 3/2015 | Ichikawa | |
| 2015/0281959 | A1* | 10/2015 | Yokota | H04W 12/06 726/7 |
| 2017/0010933 | A1* | 1/2017 | Wang | G06F 11/0736 |

OTHER PUBLICATIONS

International Searching Authority, The International Search Report and the Written Opinion, PCT/US2015/020290, dated Dec. 11, 2015, 11 Pgs.

Wikipedia, "Link Layer Discovery Protocol" (webpage), available online at <https://en.wikipedia.org/w/index.php?title=Link_Layer_Discovery_Protocol&oldid=755990989>, Dec. 21, 2016, 3 pages.

International Preliminary Report on Patentability received for PCT Patent Application No. PCT/US2015/020290, dated Sep. 21, 2017, 8 pages.

Alorie Gilbert, "HP developing 'smart rack' to ease data center work" (webpage), available online at <https://www.cnet.com/news/hp-developing-smart-rack-to-ease-data-center-work/>, Oct. 29, 2004, 6 pages.

* cited by examiner

COMPUTING DEVICE LOCATION

BACKGROUND

Many computing systems today include numerous computing devices that can be accessed remotely. For example, a data center may have hundreds or thousands of servers located on several floors, rooms, server racks, and so forth. A user may often communicate with a computing device remotely, without knowing the device's exact location within the computing system.

BRIEF DESCRIPTION OF THE DRAWINGS

The following detailed description references the drawings, wherein.

DETAILED DESCRIPTION

As mentioned above, a user may sometimes communicate with a computing device remotely without knowing the device's exact location within the computing system. In some situations, however, the location of the device with which the user is communicating needs to be established. For example, a user may identify a problem with a particular computing device, and report the problem to the system administrator. The user may know and provide to the system administrator the device's Internet Protocol (IP) address, Media Access Control (MAC) address, host name, serial number, or other identifiers. But in order to physically examine and/or fix the computing device, the system administrator may need to determine the exact physical location (e.g., room number, rack number, and position within the rack) of the computing device within the computing system.

Examples disclosed herein describe, among other things, a computing device. The computing device may include a timing engine and a location engine. The timing engine may obtain reset information associated with a plurality of computing devices located at a plurality of locations, wherein each computing device comprises a timer. The timing engine may also obtain timer values of the timers of the plurality of computing devices. The location engine may determine, based at least on the reset information and the timer values, the location of at least one of the plurality of computing devices.

Figure 1:
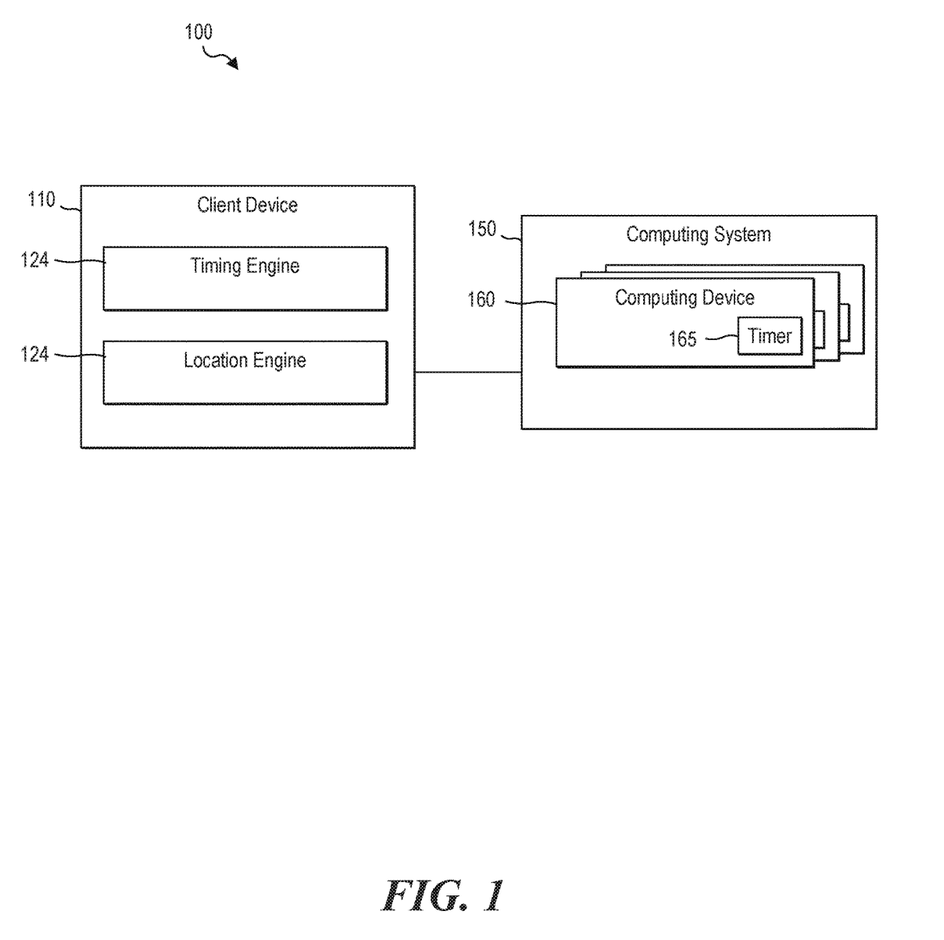
FIG. 1 is a block diagram of an example system including a computing system and a client device.

FIG. 1 is a block diagram of an example system 100. System 100 may include, among other things, a computing system 150 and a client device 110. Computing system 150 may be any system that includes a plurality of (e.g., two or more) computing devices 160. For example, computing system 150 may be a server rack including a plurality of servers, or a data center including a plurality of server racks. In some examples, computing system 150 may also include components (not shown for brevity) that provide computing devices 160 with power, cooling, networking, storage, management, interconnectivity, physical enclosure, and other shared services and resources. While in some examples computing system 150 may physically enclose all computing devices 160, in other examples at least some computing devices 160 may be communicatively coupled to computing system 150 without being physically located in a common space or enclosure.

Each computing device 160 may include one or more electronic devices such as server computers, blade servers, desktop computers, notebook computers, tablet computing devices, mobile phones, or any other type of electronic devices. Different computing devices 160 within computing system 150 may be devices of different types, run different applications, and be owned and operated by different entities. While some examples used herein describe computing system 150 and computing devices 160 as data centers and servers, it is appreciated that the systems, methods, and techniques described herein are also applicable to other types of computing system 150 and computing devices 160.

In some examples, each computing device 160 within computing system 150 may include a timer 165. In other examples, some computing devices 160 may not include timer 165. Timer 165 may be implemented as any combination of hardware and programming. In some examples, timer 165 may include or be implemented based on a hardware dock. Timer 165 may be a free-running timer, i.e., a timer that does not stop upon reaching a certain predefined value. The value of timer 165 may increase or decrease with time, and in some examples may automatically wrap around upon reaching a maximum or minimum allowable value, respectively. In some examples, timer 165 may be a timer whose value represents the amount of time (e.g., in seconds, milliseconds, etc.) that has passed since the last reset event. In some examples, when a reset event occurs, the value of each timer 165 may be automatically reset to a predefined reset value (e.g., 0).

In some examples, a reset event may be application of AC or DC to computing device 160. That is, in some examples, timer 165 may start running (e.g., from the predefined reset value) when a system administrator physically connects or otherwise electrically couples computing device 160 to power. In some examples, timer 165 may start running as soon as power (e.g., AC power) is applied to the auxiliary power plane of computing device 160. Applying power to the auxiliary power plane may power up only parts of computing device 160, such as its light-out management system and a management processor. The lights-out management system and the management process, if included in computing device 160, may allow users to manage computing device 160 even when some of the device's systems (e.g., its main processor, memory, operating system, etc.) are not powered up or are not operational.

Alternatively or in addition, in some examples, an already-running timer 165 may be reset by the system administrator by physically manipulating a control associated with computing device 160. Such a control may be, for example, a power button used for powering up computing device 160, a unit identification (UID) button used for identifying computing device 160, or any other type of control. Alternatively or in addition, in some examples, timer 165 may be reset by the system administrator by inserting or removing a cable (e.g., a USB cable of a flash drive, keyboard, mouse, etc.) into or from computing device 160. Thus, as illustrated in the above examples, a reset event (during which timer 165 may be reset) may include, for example, application of AC and/or DC power to computing device 160, physical manipulation of a control coupled to computing device 160, insertion of a cable into computing device 160, removal of a cable from computing device 160, or any combination of these or other events.

Figure 2:
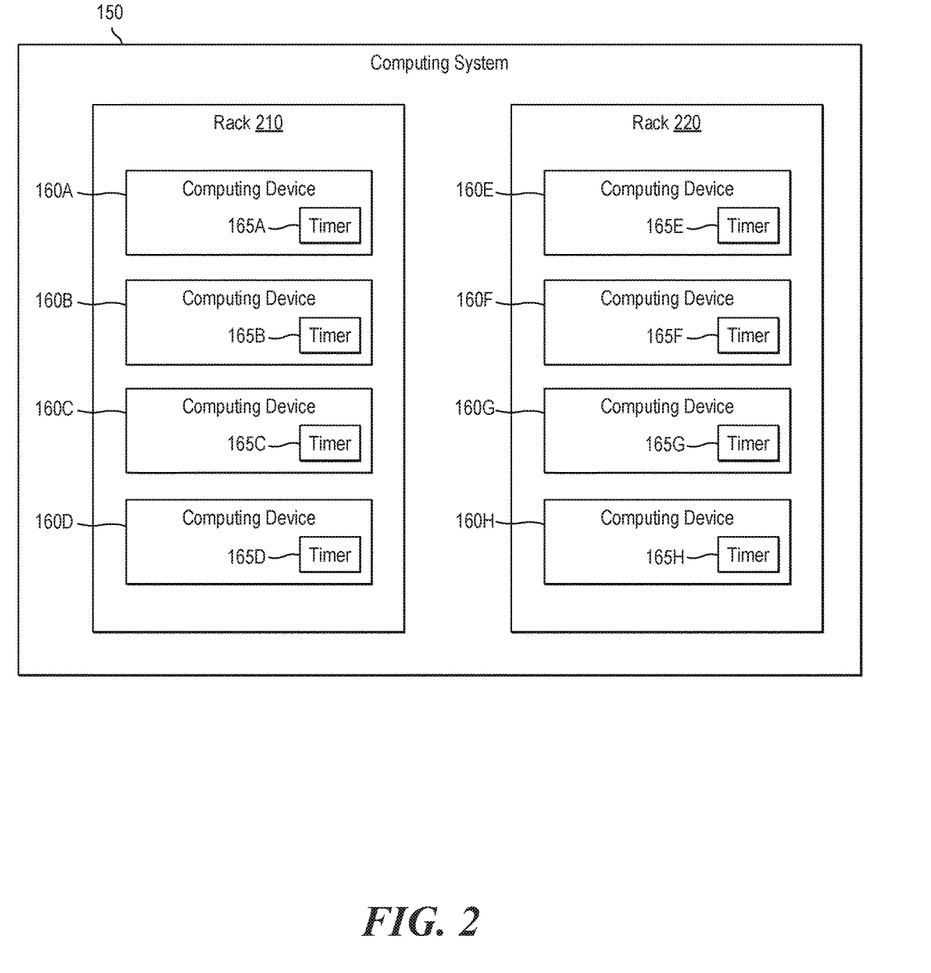
FIG. 2 illustrates an example computing system.

In an example illustrated in FIG. 2, computing system 150 includes computing devices 160A-H. As discussed above, in some examples, computing devices 160 within computing system 150 may be arranged in various group. A group of computing devices may or may not correspond to the physical boundaries or enclosures. For example, a server rack may correspond to one group of computing devices, or it may include several groups of computing devices (e.g., each group including devices of the same type or the same function).

In the example of FIG. 2, computing devices 160A-D are physically located in rack 210, and computing devices 160E-H are physically located in rack 220. Specifically, computing devices 160A and 160E are located in the first (e.g., top) row of their respective racks; computing devices 160B and 160F are located in the second row of their respective racks; computing devices 160C and 160G are located in the third row of their respective racks; and computing devices 160D and 160H are located in the fourth (e.g., bottom) row of their respective racks. Thus, in this example, each computing device 160 is associated with a location that may be defined by a particular rack and a particular position within the rack. In other examples, the location of each device may be defined by any combination of any parameters that may allow the system administrator to locate the device within computing system 150.

In some examples, timers 165 of all or some computing devices 160 within computing system 150 may be reset by the system administrator in accordance with a specific reset sequence. The reset sequence may indicate the order in which timers 165 were reset. For example, if timers 165 start running when power is first applied to their respective computing devices 160, the system administrator may apply the power to all computing devices 160 in a particular order. Alternatively or in addition, if timers 165 can be reset via external controls (e.g., buttons) coupled to computing devices 160, the system administrator may systematically activate such controls in a particular order.

In some examples, the reset sequence may also indicate a minimum time interval between any two consecutive timer resets, in which case the system administrator may reset timers 165 such that there is at least a minimum time interval (e.g., 2 seconds) between two consecutive resets. To illustrate, after resetting one timer 165 (e.g., by providing power to or pressing a button on the corresponding computing device 165), the system administrator may wait at least a predefined minimum time interval before resetting timer 165 of another computing device 160.

In some examples, the reset sequence may also indicate a new-group time interval. In these examples, the system administrator may wait at least the new-group time interval (e.g., 10 seconds) between resetting timers 165 of computing devices 160 that are associated with different groups. In some examples, the new-group time interval may be longer than the minimum time interval. In these examples, the time interval between two consecutive timer resets of computing devices 160 belonging to the same group may be longer than the minimum time interval and shorter than the new-group interval, and the time interval between two consecutive resets of timers 165 of computing devices 160 belonging to different groups may be longer than the new-group interval. To illustrate, the system administrator may wait 2-10 seconds between consecutive timer resets of devices within the same group, and wait more than 10 seconds before proceeding to reset timers of devices in another group (e.g., servers in an adjacent server rack).

Referring back to FIG. 1, system 100 may also include a client device 110. Client device 110 may include any electronic device or a combination of electronic devices. The term "electronic device" as used herein may include any combination of portable and stationary electronic devices. Thus, client device 110 may include, for example, a smartphone, a tablet computer, a laptop computer, a desktop computer, a server, a smart watch or another wearable device, or any other electronic device. It is appreciated that the term "client" as used herein to describe client device 110 is used for illustration purposes only and is not limiting in any way. Thus, in some examples, client device 110 may act as a server. In some examples, client device 110 may be one of computing devices 160 of computing system 150.

In some examples, client device 110 may include a timing engine 124 and a location engine 126, each of which may generally represent any combination of hardware and programming. In some examples, timing engine 124 may obtain reset information associated with a plurality of computing devices (e.g., all computing devices 160 in computing system 150). As discussed above, each computing device may include a timer, and the reset information may include a reset sequence in accordance with which the timers were reset. The reset sequence may indicate, for example, the order in which the timers were reset, the predefined minimum time interval, and/or the predefined new-group time interval discussed above. In some examples, the reset information may also indicate, for each computing device included in the resettable sequence, the location of that computing device. In some examples, the reset information may also include a map visually describing the relative positions of all the computing devices within a given space. In some examples, the reset information may also include a configuration chart describing how the computing devices are divided into groups. For example, the configuration chart may describe contents of one or more racks, e.g., the order of the different servers within the different racks, and the characteristics of each server, such as the server's size (e.g., 1U, 2U, 3U, etc.), main function, manufacturer, etc. In some examples, the reset information may not include the device's MAC address, IP address, or any other information uniquely identifying the device, other than the device's location.

In some examples, the reset information may be obtained by timing engine 124 from a volatile or a non-volatile memory or storage device, where the reset information may have been stored, for example, by the system administrator. In some examples, the reset information may be obtained by timing engine 124 from the system administrator through a user interface. For example, client device 110 may include a display and an input device, such as a touch-sensitive display, a keyboard, etc. In these examples, the reset information may be inputted by the system administrator and obtained by timing engine 124 through a user interface displayed on the display.

As discussed above, the reset information may describe the reset sequence of the computing devices. For example, the reset information may include a list of computing device locations, and the order in which the timer of the computing device at each location was or will be reset. As another example, the reset information may include one or more rules followed by the system administrator in resetting the timers of the devices. A rule may indicate, for example, that all devices within the same rack were or will be reset in a top-down (or a bottom-up) direction. Alternatively, a rule may indicate that the devices were or will be reset in a top-to-bottom manner in odd-numbered racks and in a bottom-to-top manner in even-numbered racks. A rule may also describe, for example, that timers of devices in one rack were or will be reset before the timers of devices in another rack, and may generally indicate the order that the system administrator followed or will follow when going between racks to reset the timers.

In some examples, timing engine 124 may also obtain timer information associated with the plurality of computing devices. The timer information may include timer values of timers (e.g., 165) of the plurality of computing devices (e.g., 160). Timing engine 124 may obtain the timer values in any number of suitable ways. In some examples, timing engine 124 may connect to each computing device individually, for example, via one or more wireless and/or wired networks such as local-area networks (LANs), and/or wide-area networks (WANs) such as the Internet. In some examples, timing engine 124 may connect to the computing devices via dedicated lights-out management systems or management processors included in the computing devices. After connecting to a computing device, engine 124 may communicate with the computing device via any suitable protocol, such as a Hypertext Transfer Protocol (HTTP), HTTP Secure (HTTPS), Intelligent Platform Management Interface (IPMI), broadcast or multicast protocols, or any other in-band or out-of-band protocols, to request and receive the current value of the timer of the computing device.

In some examples, engine 124 may obtain the timer value during software deployment using a Preboot Execution Environment (PXE) or other suitable environments. In some examples, the computing device may communicate the timer value to the client device by including the timer value, automatically or upon request, in a PXE message or in a Dynamic Host Configuration Protocol (DHCP) message (e.g., if client device 110 serves as the DHCP server for the computing devices). In some examples, after obtaining the timer values of the plurality of computing devices, engine 124 may normalize the timer values, for example, by adjusting some timer values to compensate for the difference in sampling time of each timer.

In addition to the timer values, timer information obtained by engine 124 may include, for each timer value, a device identifier identifying the computing device associated with the timer value, i.e., the computing device that includes the timer to which the timer value corresponds. The device identifier may include any combination of the device's IP address, MAC address, host name, serial number, and other identifiers. In some examples, the timer information may not include data specifically identifying the device's location.

After obtaining the reset information the timer information, timing engine 124 may pass the reset information and the timer values to location engine 126. Location engine 126 may determine, based on the (optionally normalized) reset information and timer information, the locations of one, some, or all computing devices from the plurality of computing devices. In some examples, the timer values received by engine 126 may not be sorted, in which case engine 126 may sort the timer values. Using the sorted timer values, engine 126 may determine, for example, the lowest timer value and the highest timer value. As discussed above, each timer value may represent the amount of time that the timer has been running since it started running or since its last reset. Accordingly, if the timers count upward, the highest timer value may correspond to the computing device whose timer was reset first, and the lowest timer value may correspond to the computing device whose timer was reset last. Alternatively, if the timers count downward, the lowest timer value may correspond to the computing device whose timer was reset first, and the highest timer value may correspond to the computing device whose timer was reset last.

Therefore, in some examples, engine 126 may align the sorted timer values with the reset sequence information to determine which timer value corresponds to the computing device that was reset first, second, third, and so on for each of the plurality of computing devices. Having also obtained a device identifier associated with each timer value and a location associated with each computing device in the reset sequence, engine 126 may determine which device identifier corresponds to which location. After determining the locations associated with the device identifiers, engine 126 may store this information (hereinafter referred to as "identified location information") in a memory or a storage device, provide the information for display (e.g., on a display of client device 110), send it to another device, and so forth.

Figure 3:
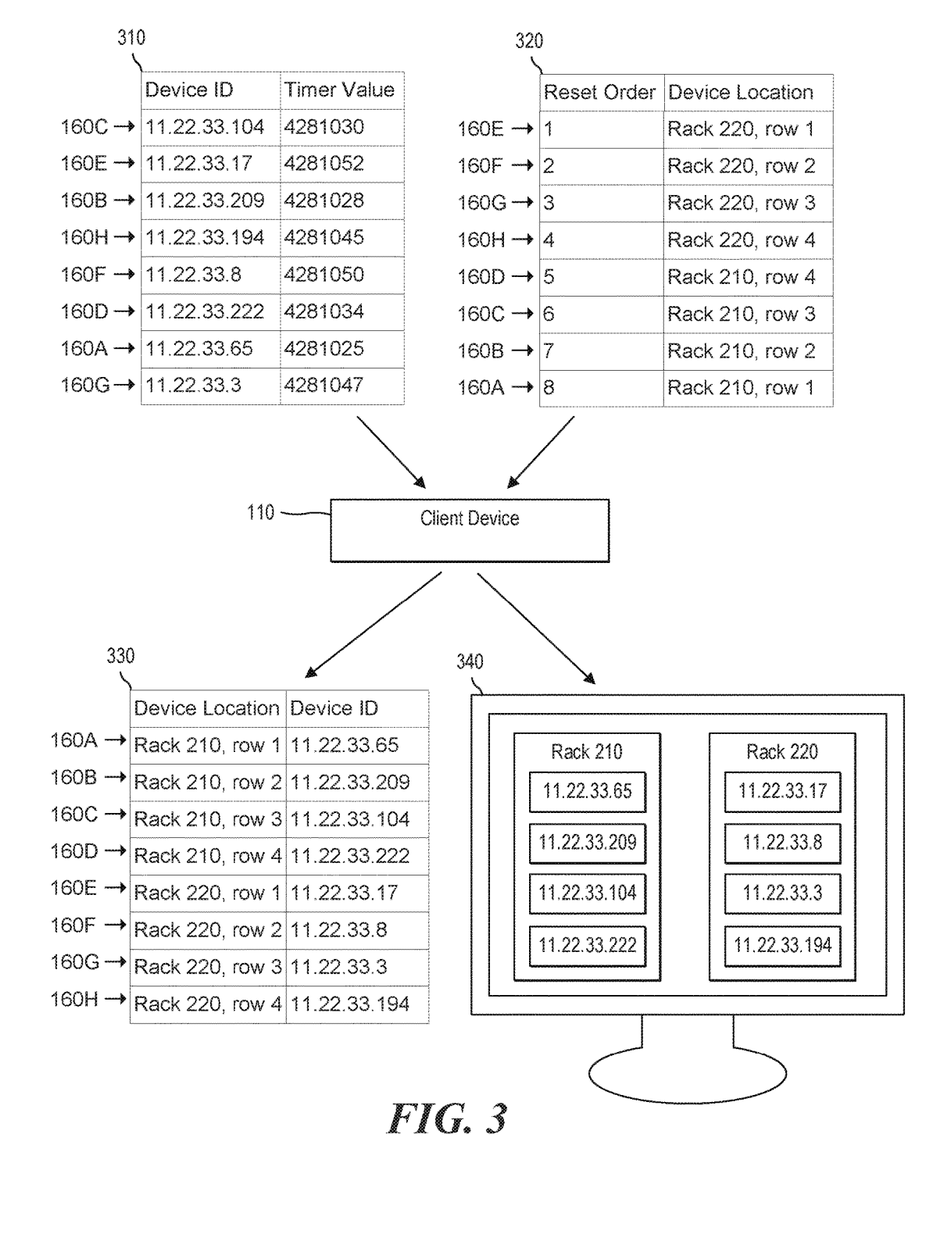
FIG. 3 illustrates an example client device.

In the example illustrated in FIG. 3, client device 110 obtains (e.g., via timing engine 124) timer information 310 and reset information 320. In this example, timer information 310 includes eight timer values obtained from eight computing devices 160A-H, each timer value being associated (e.g., paired) with a device identifier (e.g., an IP address) identifying the corresponding computing device 160. Reset information 320 in this example includes a reset sequence specifically identifying the order in which computing devices 160A-H were reset, where each device is identified by its location. Specifically, the sequence in this example indicates that the system administrator first resets computing devices in rack 220 going from the top down, and then resets computing devices in rack 210 going from the bottom up. Also, assuming that the timer values in FIG. 3 represent seconds, in this example the minimum time interval followed by the system administrator may be 2 seconds, and the new-group interval may be 10 seconds. Accordingly, in this example the timer intervals between resetting devices in the same rack is between 2 and 10 seconds, and the time interval between resetting devices in different racks (e.g., between 160H and 160D) is more than 10 seconds.

As discussed above, based at least on the obtained timer information 310 and reset information 320, client device 110 may determine identified location information 330 which describes which locations are associated with which device identifiers. As discussed above, client device 110 may store identified location information 330 in a memory or a storage device, provide it to another device, and/or provide it for display 340, which may be a display included in or coupled to client device 110, or a display coupled to another device. As illustrated in FIG. 3, identified location information 330 may be presented on a display in a way that visually reflects the various locations of various computing devices within the computing system. For example, client device 110 may present the identified location information using a map and/or a configuration chart, which may be received as part of the reset information, as discussed above. As a result, a user may be able to see, for example, a map showing locations of all server racks, the positions of the individual servers within the server racks, the sizes of the individual servers, their device identifiers (e.g., IP addresses, MAC addresses, etc.) and other relevant information.

In some examples, e.g., if the reset information includes a new-group time interval higher than the minimum time interval, location engine 126 may determine group information associated with the plurality of computing devices even if such information is not provided as part of the reset information. For example, location engine 126 may analyze the sorted timer values to determine one or more intervals, between consecutive timer values, that are longer than the predefined new-group intervals. Accordingly, client engine 126 may determine that all timer values not separated by such intervals correspond to computing devices from the same group (e.g., the same rack).

In foregoing discussion, engines 124 and 126 were described as any combinations of hardware and programming. Such components may be implemented in a number of fashions. The programming may be processor executable instructions stored on a tangible, non-transitory computer readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer readable medium can be said to store program instructions that when executed by the processor resource implement the functionality of the respective component. The computer readable medium may be integrated in the same device as the processor resource or it may be separate but accessible to that device and the processor resource. In one example, the program instructions can be part of an installation package that when installed can be executed by the processor resource to implement the corresponding component. In this case, the computer readable medium may be a portable medium such as a CD, DVD, or flash drive or a memory maintained by a server from which the installation package can be downloaded and installed. In another example, the program instructions may be part of an application or applications already installed, and the computer readable medium may include integrated memory such as a hard drive, solid state drive, or the like.

Figure 4:
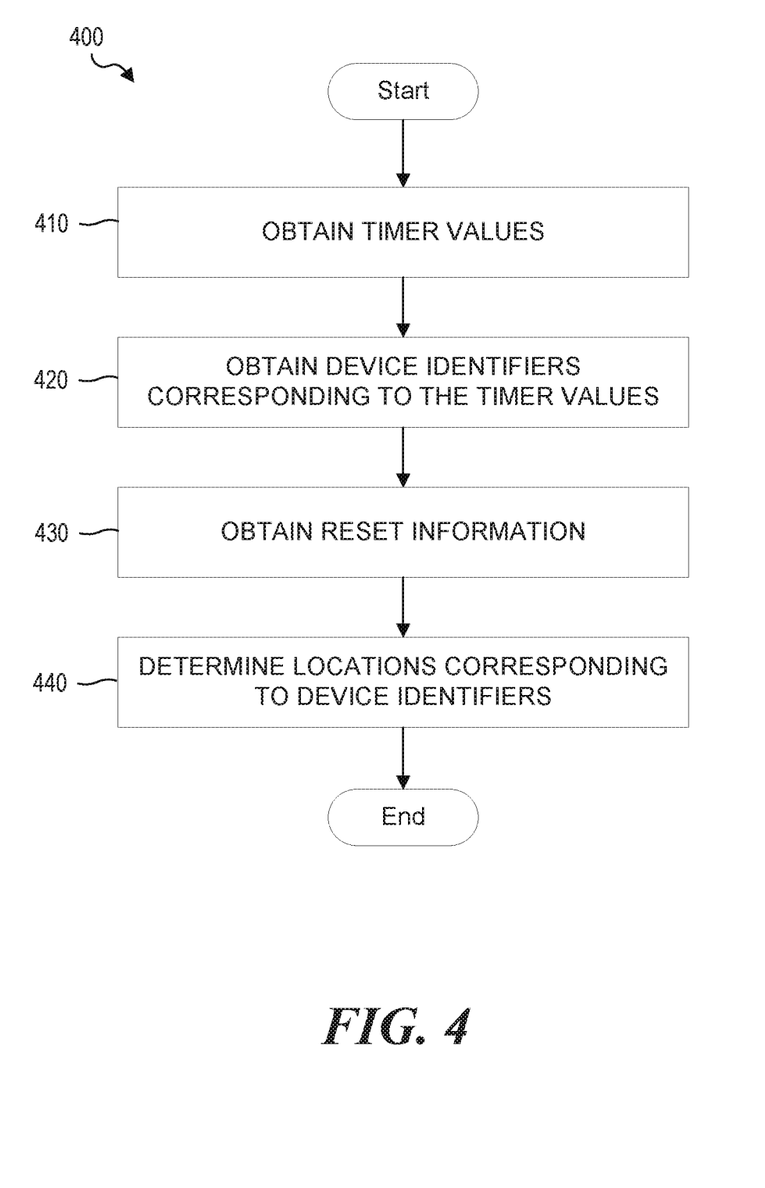
FIG. 4 is a flowchart of an example method for determining locations corresponding to device identifiers.

FIG. 4 is a flowchart of an example method 400 for determining locations corresponding to device identifiers. Method 400 may be described below as being executed or performed by a computing device, for example, client device 110 of FIG. 1. Other suitable systems and/or computing devices may be used as well. Method 400 may be implemented in the form of executable instructions stored on at least one non-transitory machine-readable storage medium of the computing device and executed by at least one processor of the client device. Alternatively or in addition, method 400 may be implemented in the form of electronic circuitry (e.g., hardware). In alternate examples of the present disclosure, one or more or blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

At block 410, method 400 may obtain a plurality of timer values corresponding to a plurality of timers running on a plurality of computing devices. As discussed above, in some examples, each of the timers is to reset when auxiliary power is provided to the computing device that includes the timer, and/or when a control coupled to the computing device comprising the timer is manually activated (e.g., by the system administrator). At block 420, the method may also obtain, for each timer value, a device identifier identifying a computing device associated with the timer value. As discussed above, in some examples, the device identifier may include any combination of a MAC address, an IP address, a serial number, and other types of identifiers.

At block 430, the method may also obtain reset information that may indicate, among other things, a reset sequence associated with the plurality of computing devices. As discussed above, the reset sequence may indicate locations of the plurality of computing devices. Further, in some examples, the reset information may include a reset sequence according to which the timers of the plurality of computing devices are reset. At block 440, the method may determine, based at least on the timer values and the reset information, a corresponding location for each device identifier in the plurality of device identifiers, as discussed above.

Figure 5:
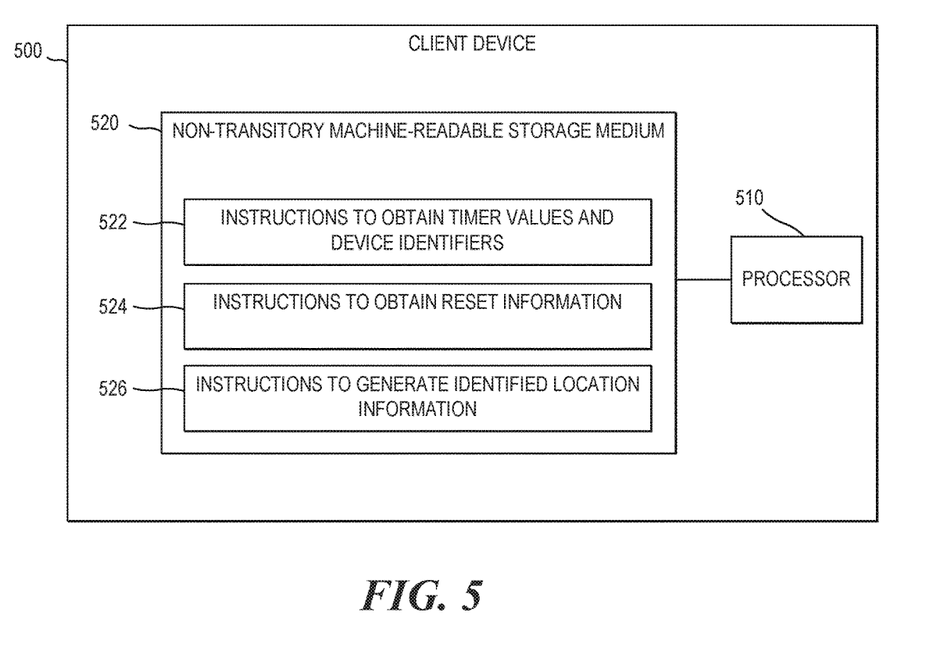
FIG. 5 is a block diagram of another example client device.

FIG. 5 is a block diagram of an example client device 500. Client device 500 may be similar to client device 110 of FIG. 1. In the example of FIG. 5, client device 500 includes a processor 510 and a non-transitory machine-readable storage medium 520. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in non-transitory machine-readable storage medium 520. In the particular example shown in FIG. 4, processor 510 may fetch, decode, and execute instructions 522, 524, 526, or any other instructions (not shown for brevity). As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 520 may be any electronic, magnetic, optical, or other physical storage device that stores executable instructions. Thus, medium 520 may be, for example, Random Access Memory (RAM), an Electrically-Erasable Programmable Read-Only Memory (EEPROM), a storage drive, an optical disc, and the like. Medium 520 may be disposed within computing device 500, as shown in FIG. 5. In this situation, the executable instructions may be "installed" on computing device 500. Alternatively, medium 520 may be a portable, external or remote storage medium, for example, that allows client device 510 to download the instructions from the portable/external/remote storage medium. In this situation, the executable instructions may be part of an "installation package". As described herein, medium 520 may be encoded with executable instructions for generating report(s).

Referring to FIG. 5, instructions 522, when executed by a processor (e.g., 510), may cause a client device (e.g., 500) to obtain a plurality of timer values associated with timers of a plurality of computing devices, and to obtain a plurality of device identifiers corresponding to the plurality of timer values. As discussed above, in some examples, each of the timers of the plurality of computing devices may start running when auxiliary AC power is applied to a corresponding computing device from the plurality of computing devices.

Instructions 524, when executed by the processor, may cause the client device to obtain reset information indicating locations of the plurality of computing devices and to obtain a reset sequence in accordance with which the timers of the plurality of computing devices were reset, as discussed above. Instructions 526, when executed by the processor, may cause the client device to generate identified location information associating each of the plurality of device identifiers with a corresponding location, as discussed above.

The invention claimed is:

1. A client device comprising:
a timing engine to:
obtain reset information associated with a plurality of computing devices located at a plurality of locations, wherein each computing device comprises a timer, and
obtain timer values of the timers of the plurality of computing devices; and a location engine to:
determine, based at least on the reset information and the timer values, the location of at least one of the plurality of computing devices,
wherein the reset information comprises a reset sequence according to which the timers of the plurality of computing devices are reset, and
wherein each of the timers is to reset when at least one of i) auxiliary power is provided to the computing device comprising the timer; and ii) a control coupled to the computing device comprising the timer is manually activated.

2. The client device of claim 1, wherein the timers are reset at different times that are at least a predefined minimum interval of time apart of each other.

3. The client device of claim 1, wherein determining the location of at least one of the plurality of computing devices comprises determining a position of at least one of the plurality of computing devices within a computing system.

4. The client device of claim 3, wherein the computing system comprises at least one server rack and the plurality of computing devices comprise a plurality of servers.

5. The client device of claim 1, wherein determining the location of at least one computing device of the plurality of computing devices comprises determining a group of computing devices associated with the computing device.

6. The client device of claim 1, wherein the location engine is to determine and provide for display the location of each of the plurality of computing devices.

7. The client device of claim 1, wherein the reset information is obtained from a user through a user interface displayed on a display coupled to the client device.

8. A method comprising:
obtaining a plurality of timer values corresponding to a plurality of timers running on a plurality of computing devices;
for each timer value in the plurality of timer values, obtaining a device identifier identifying a computing device associated with the timer value;
obtaining reset information, the reset information indicating at least a reset sequence associated with the plurality of computing devices, the reset sequence indicating locations of the plurality of computing devices; and
based at least on the timer values and the reset information, determining a corresponding location for each device identifier in the plurality of device identifiers,
wherein each of the timers is to reset when at least one of i) auxiliary power is provided to the computing device comprising the timer, and ii) a control coupled to the computing device comprising the timer is manually activated.

9. The method of claim 8, wherein the device identifier comprises at least one of a Media Access Control (MAC) address, an Internet Protocol (IP) address, and a serial number.

10. The method of claim 8, wherein the reset information comprises a reset sequence according to which the timers of the plurality of computing devices are reset.

11. A non-transitory machine-readable storage medium encoded with instructions executable by at least one processor of at least one client device to cause the client device to:
obtain a plurality of timer values associated with timers of a plurality of computing devices, and a plurality of device identifiers corresponding to the plurality of timer values;
obtain reset information indicating locations of the plurality of computing devices and a reset sequence in accordance with which the timers of the plurality of computing devices were reset; and
generate identified location information associating each of the plurality of device identifiers with a corresponding location,
wherein each of the timers is to reset when at least one of i) auxiliary power is provided to the computing device comprising the timer, and ii) a control coupled to the computing device comprising the timer is manually activated.

12. The non-transitory machine-readable storage medium of claim 11, wherein the timers are reset at different times that are at least a predefined minimum interval of time apart of each other.

13. The non-transitory machine-readable storage medium of claim 11, wherein the timers are reset at different times that are at least a predefined minimum interval of time apart of each other.

14. The non-transitory machine-readable storage medium of claim 11, wherein the computing devices are included as part of a computing system, the computing system comprises at least one server rack, and the plurality of computing devices comprise a plurality of servers.

* * * * *